Figure 1:
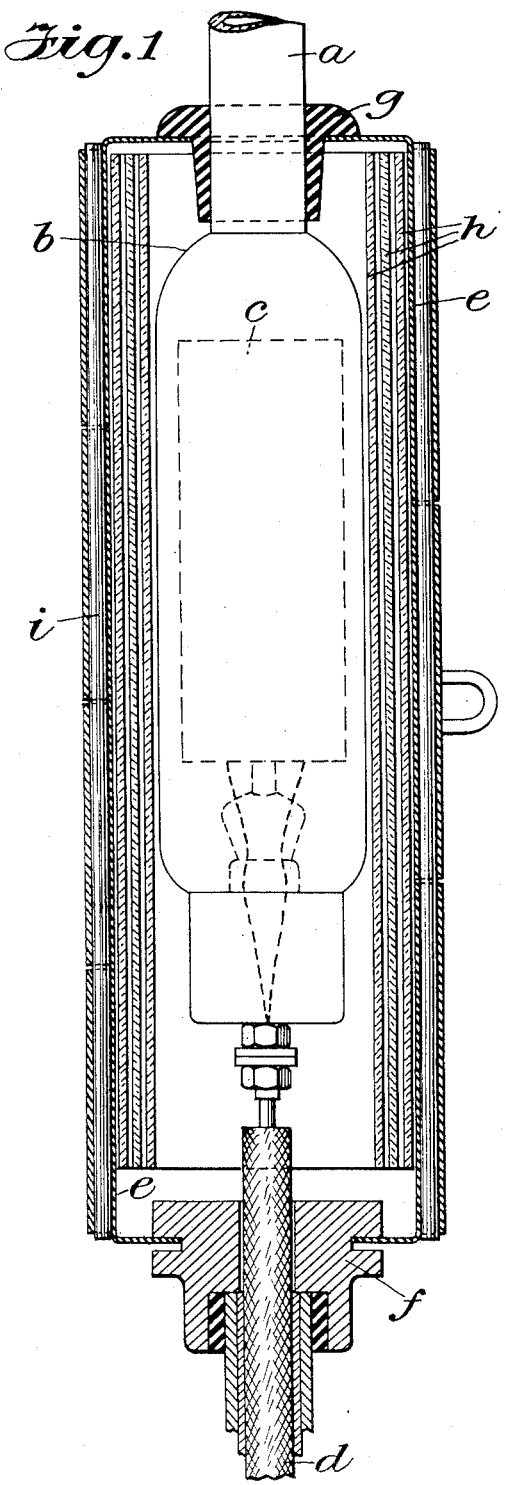

April 7, 1931. K. WIEGAND 1,799,339
ELECTRIC LIGHTING TUBE
Filed Oct. 18, 1927

INVENTOR
Kurt Wiegand,
BY
ATTORNEY

Patented Apr. 7, 1931

1,799,339

UNITED STATES PATENT OFFICE

KURT WIEGAND, OF BERLIN, GERMANY, ASSIGNOR TO GENERAL ELECTRIC COMPANY, A CORPORATION OF NEW YORK

ELECTRIC-LIGHTING TUBE

Application filed October 18, 1927, Serial No. 226,994, and in Germany November 12, 1926.

The present invention relates to electric lighting tubes of the type wherein the electrode containers are enclosed in metal cases.

In electrical lighting tubes which are freely arranged in rooms or on the housefronts, the electrode containers provided at the ends of the tube, due to safety regulations, must be enclosed in earthed metal cases. Between these metal cases and the electrode containers there has always hitherto been provided an airspace which is chosen so large according to the length of the tube and the voltage applied, that the perforation voltage does not suffice to bridge over the airspace. By the provision of this necessary airspace the enclosing metal cap becomes however frequently so large that together with the inserted electrode it becomes unwieldy and unsightly. It also happens that despite the calculated airspace there nevertheless occurs perforation or short circuit, especially when for any reasons, say by vibrations or voltage increase, a breakage of the electrode container and therewith an easier current passage to the metal cap has occurred.

By the present invention these is provided in the capped electrode casings between the latter and the enclosing metal casing in place of the hitherto usual airspace a non-hygroscopic insulation, say of glass, hard rubber, mica or glazed porcelain. As has been found, the distance between the metal casing from the inserted electrode container can with the provision of such an interlayer be essentially smaller, than when providing an intermediate airspace, as such insulations have a far greater insulating capacity than an airspace and also exercise their full effectiveness even with a break of the electrode container. A further advantage of the new, non-hygroscopic intermediate layer consists in that the electrode container is held better in position than with the hitherto most frequently used clamps and is secured against breakage by vibrations or shocks. The increased resistance to shock finally gives the possibility of making the metal casings of a thinner sheet metal than was hitherto usual.

A presupposed condition for the new effects to be obtained is certainly that for the interlayer there must be used a non-hygroscopic insulating material. Thus there are not to be used the insulting material mostly used in electric lines, thus for example cement, gypsum, putty, asbestos or similar fiber goods, as these attract dampness and then prevent even less than an airspace the passage of current between the electrode container and the exterior metal casing.

It is advantageous to fill out the space between the electrode container and the metal casing not by a single non-hygroscopic insulating body, but by several. For example, there can be arranged in the space between the electrode container and the metal casing a number of concentrical glass tubes closely pushed over one another or also a number of glass rods or glass balls set next to one another. In this case there is to be feared in a lesser measure a complete destruction of the insulating intermediate layer, for at most there can be damaged the glass tube directly next to the break or the glass rod or glass ball lying next to the point of breakage.

Figure 2:
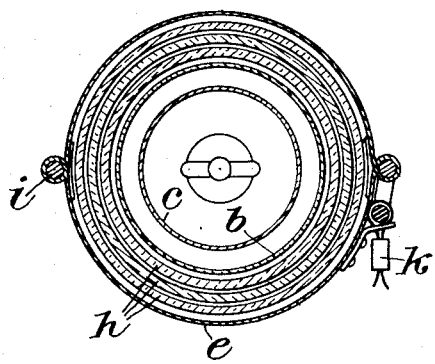
Figure 3:
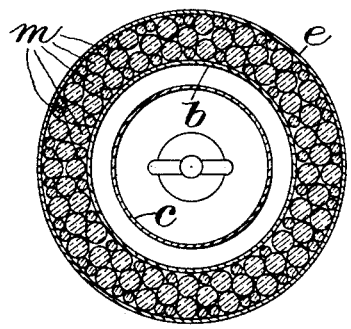

An example of construction of an encased electrode container is shown in the drawing, in Figure 1 in longitudinal section and in Figure 2 in cross section. Figure 3 shows a cross section through another form of construction.

The electric lighting tube $a$ is as usual provided at each end with an electrode container $b$. Into the interior of the latter there is built in a sheet metal electrode $c$, to which current is fed by cable $d$. The electrode container $b$ is enclosed by a metal casing $e$, which has at the inlet point of the cable $d$ a closure part $f$ and at the point of issuance of the lighting tube $a$ rubber sleeve $g$. Between the container $b$ and the metal casing $e$ there are provided three glass tubes $h$ arranged concentrically to one another and which fill out closely the space between the electrode container $b$ and the metal casing $e$. The casing $e$ is advantageously made in two parts and can be opened about the hinge $i$. The point of closure of the casing $e$ can be still further secured by the seal $k$.

In the form of construction of Figure 3 the space between the electrode container $b$ and the metal casing $e$ is filled out by a larger number of glass rods or glass balls $m$ set next to one another. In this case a casing is used to advantage which can be opened in one of its bottoms.

What I claim as new and desire to secure by Letters Patent of the United States, is:—

1. An electric discharge device hving an electrode container, a metal shield about said container, and non-hygroscopic insulation between said container and said shield.

2. An electric discharge device having an electrode chamber, a metal shield about said chamber, and spaced therefrom and a plurality of concentric vitreous tubes in the space between said chamber and said shield.

3. An electric discharge device having an electrode container, a metal shield about said container and spaced therefrom, and a subdivided non-hygroscopic insulating material in the space between said container and said shield.

4. An electric discharge device having an electrode container, a metal shield about said container, and insulating material having a higher dielectric strength than air between said container and said shield.

5. An electric discharge device having an electrode container, a metal shield about said container and spaced therefrom, and a plurality of vitreous bodies in the space between said container and said shield.

In witness whereof, I have hereunto set my hand this 6th day of October, 1927.

KURT WIEGAND.